Feb. 17, 1959    H. G. ELWELL, JR., ET AL    2,874,375
ELECTRIC SIGNALING AND INDICATING APPARATUS
Filed Dec. 1, 1953    5 Sheets-Sheet 1
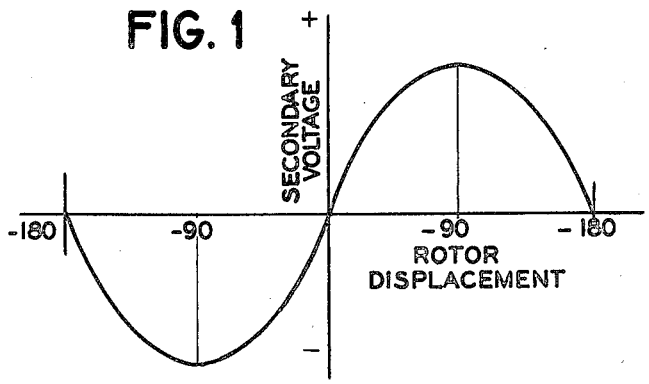
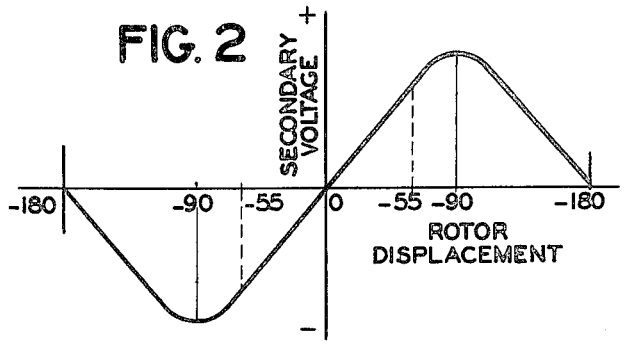
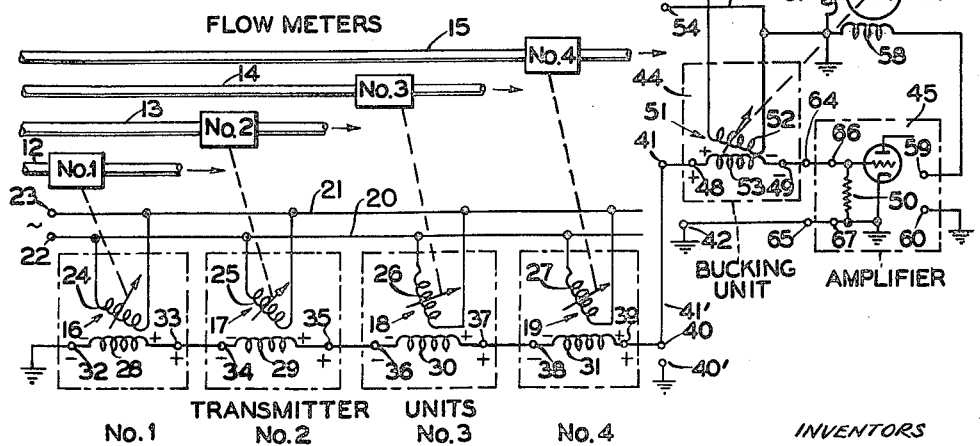
INVENTORS
HENRY G. ELWELL JR.
SIGMUND MACHLANSKI
BY Tyler S Roundy
ATTORNEY Feb. 17, 1959   H. G. ELWELL, JR., ET AL   2,874,375
ELECTRIC SIGNALING AND INDICATING APPARATUS
Filed Dec. 1, 1953   5 Sheets-Sheet 2
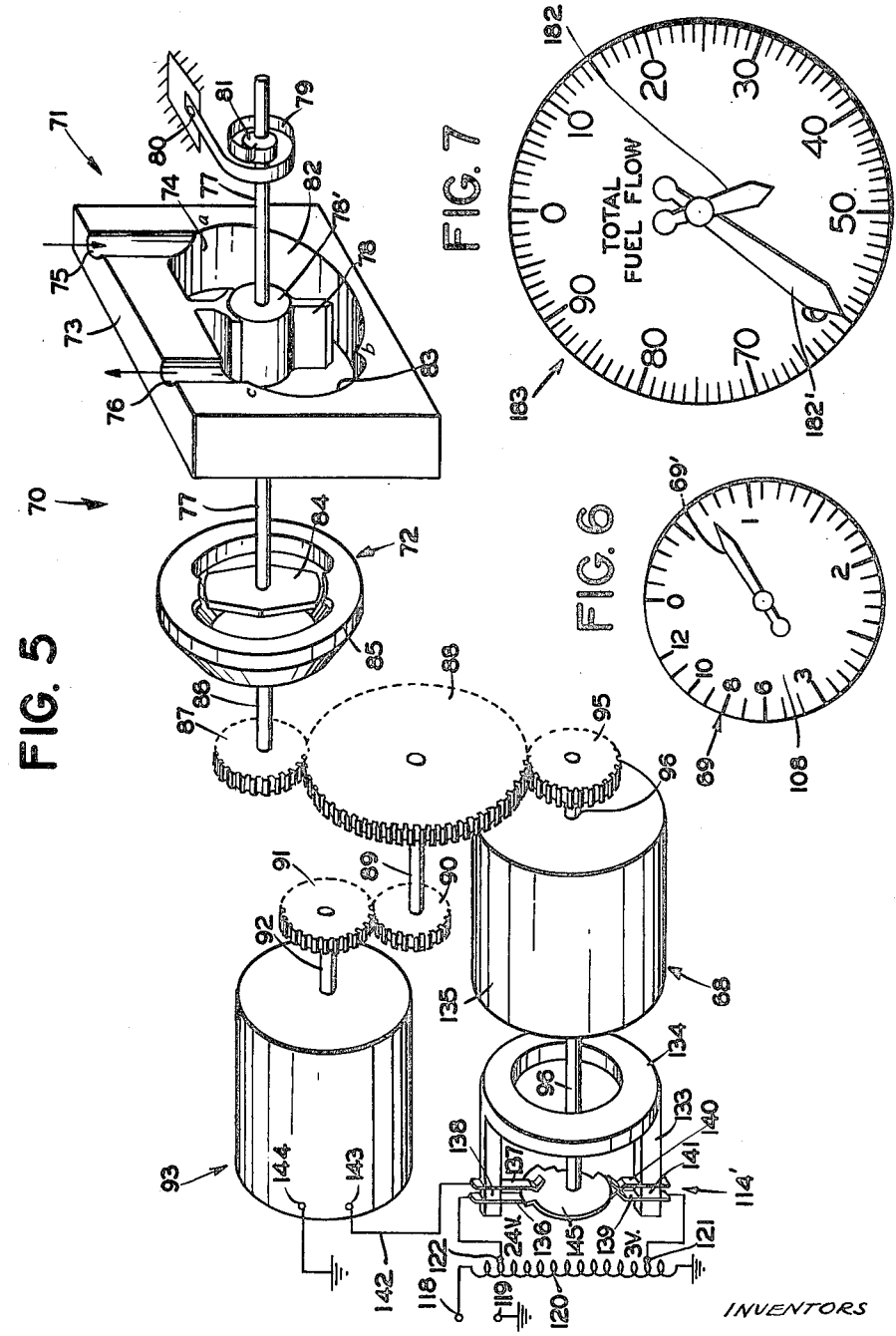
INVENTORS
HENRY G. ELWELL JR.
SIGMUND MACHLANSKI
BY Tyler & Roundy
ATTORNEY INVENTORS
HENRY G. ELWELL JR.
SIGMUND MACHLANSKI
BY Tyler S Roundy
ATTORNEY Feb. 17, 1959   H. G. ELWELL, JR., ET AL   2,874,375
ELECTRIC SIGNALING AND INDICATING APPARATUS
Filed Dec. 1, 1953   5 Sheets-Sheet 4
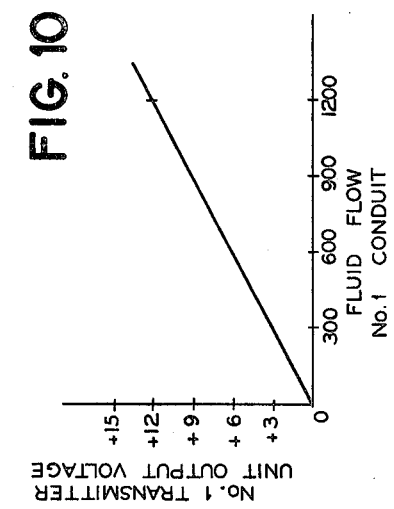
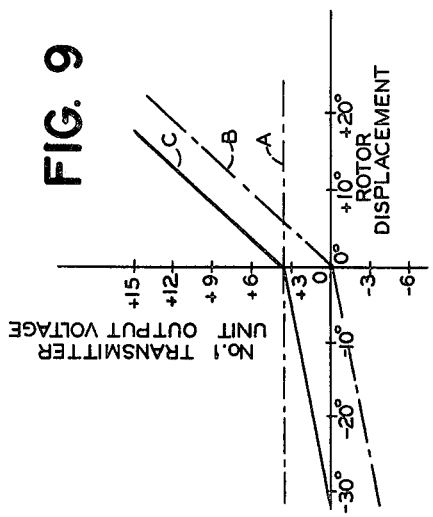
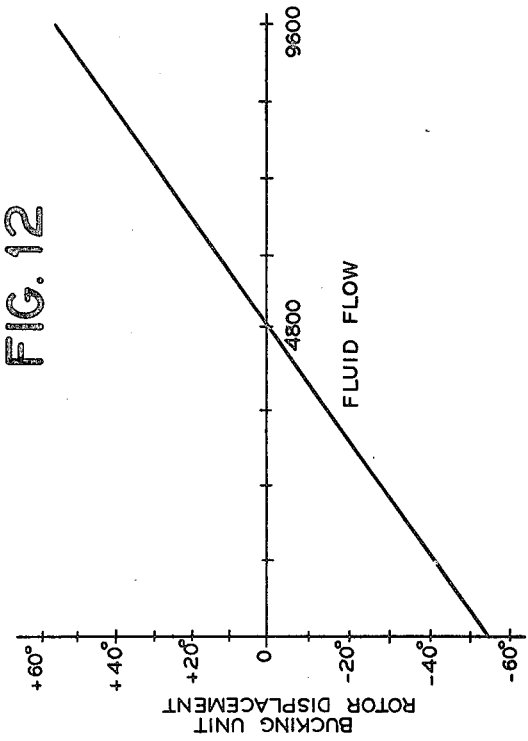
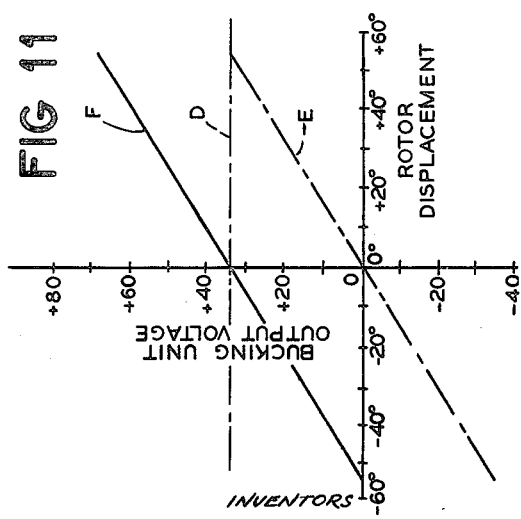
INVENTORS
HENRY G. ELWELL JR.
SIGMUND MACHLANSKI
BY Tyler S Roundy
ATTORNEY INVENTORS
HENRY G. ELWELL JR.
SIGMUND MACHLANSKI
BY Tyler S Roundy
ATTORNEY

United States Patent Office 2,874,375
Patented Feb. 17, 1959

2,874,375

ELECTRIC SIGNALING AND INDICATING APPARATUS

Henry Gandy Elwell, Jr., Hackensack, N. J., and Sigmund Machlanski, Glendora, Calif., assignors to Bendix Aviation Corporation, Teterboro, N. J., a corporation of Delaware Application December 1, 1953, Serial No. 395,450

18 Claims. (Cl. 340—182)

The present invention relates to electrical signalling and servo apparatus and particularly to servomechanisms employing variable inductive coupling devices for totalizing a plurality of variable quantities or physical conditions. The present invention relates especially to systems for measuring or indicating the total flow of fluid through a plurality of conduits.

Heretofore fluid flow totalizing systems have been one of two general types. One of these employs slidable core inductance coupling devices and the other employs "synchros." These systems have been unsatisfactory because of inherent non-linearity in such devices and the complexity of associated correction and compensating circuitry. Earlier attempts to incorporate rotatable transformers in such systems failed for the same reasons.

As a result, no acceptable systems employing rotatable transformers have heretofore been provided for applications which demand a high degree of accuracy, as required for example in a system for indicating the flow of fuel to the engines of a multiple-engine aircraft. In order to detect operational trends and abnormal aircraft performance in its incipient stage and otherwise insure safe operation of the aircraft it is essential that the pilot be continuously given a precise indication of the rate of fuel consumption.

The present invention is also concerned with the general problems created in transmitting or signalling apparatus by the provision of sensing means for controlling a transmitter or signal generator wherein the sensing means for some reason provides input intelligence to the transmitter which follows one law over part of the range of values of the condition or quantity being sensed and a different law over another part of such range of values. For example, where the sensing means is of the rotatable vane type for metering fluid flow and for some reason the vane is caused to move farther per unit change in flow in the lower flow range than in the uper flow range, then the output signal from the transmitter will not vary in a uniform linear manner of one slope over the combined lower and upper flow ranges, as is required if the system is to exert a full-range uniform linear control and if a uniform linear calibrated indicator dial is to be used.

Another general problem exists in controlled apparatus, for example, apparatus repsonsive to a resultant signal representative of a plurality of independent conditions or quantities, wherein an input signal of fixed phase, which is delivered in opposition to a bucking unit including a follow-up rotatable transformer, varies over a relatively wide range of values and wherein it is desired to obtain the required wide range of bucking signals with accurate performance while nevertheless rotating the transformer rotor only through a range wherein the voltage across its secondary winding means bears an approximately linear relationship to the rotor angular displacement and while maintaining a fixed phase for the bucking signal so that it continuously opposes the input signal.

It is an object of the present invention to provide improved electrical signalling and servo apparatus in which the aforementioned difficulties are avoided or substantially eliminated.

It is another object of the present invention to provide electrical signalling and servo apparatus characterized by substantially linear electrical performance.

It is another object of the present invention to provide a transmitter unit automatically controlled by a quantity or condition being sensed for the production of two linear voltage output characteristics of different slopes without discontinuities between the two slopes, and the two voltage output characteristics corresponding to adjoining ranges of values of the quantity or condition being sensed.

It is a further object of the present invention to provide transmitting or signalling apparatus in which special provision is made so that the law relating the magnitude of the output or transmitted signal to the value of the variable quantity or condition being sensed is maintained the same, for example uniformly linear over the entire range of values of the quantity or condition being sensed notwithstanding the fact that the sensing means for some reason supplies an input to the transmitter which follows one law over part of the range of values of the quantity or condition being sensed and a different law over another part of such range of values.

It is a further object of the present invention to provide controlled apparatus responsive to an input signal of fixed phase and relatively wide range of variations in magnitude wherein special provision is made so that a bucking unit including a follow-up rotatable transformer supplies a signal of fixed phase which continuously bucks the input signal over its wide range of variations in magnitude while nevertheless rotating the transformer rotor only through a range wherein the voltage across its secondary winding means bears an approximately linear relationship to the rotor angular displacement.

It is a still further object of the present invention to provide an improved fluid flow totalizing system employing rotatable transformers in lieu of inductive synchro devices and other variable inductive coupling devices.

It is a still further object of the present invention to provide an improved total fluid flow measuring or indicating system involving a novel cooperation of elements wherein an accurate correspondence between the measured and actual total fluid flow is obtained by providing at the transmitter and indicator stations a particular type of rotatable transformer which is specially constructed so as to have an output voltage-rotor displacement characteristic wherein the voltage induced in the secondary winding is a linear function of the angular displacement of the rotor over a relatively wide working range of displacements of the rotor in either direction from its null or minimum coupling position.

Certain of these objects are realized in part by the provision of special, individual linear measuring systems for measuring variable quantities, a special system for adding the output signals of the individual systems, and coordinating elements to relate the operation of the individual systems and the adding system to preserve linearity even when the individual measuring systems obey different linear laws.

The foregoing and other objects and advantages of the present invention will appear more fully hereinafter from a consideration of the detailed description which follows, taken together with the accompanying drawings wherein certain embodiments of the invention are illustrated by way of example. It is to be expressly understood, however, that the drawings are for illustration purposes only and are not to be construed as defining the limits of the invention.

In the drawings wherein like reference numerals refer to like parts,

Fig. 1 illustrates graphically the output voltage-rotor displacement characteristic for a conventional rotatable transformer;

Fig. 2 illustrates graphically the output voltage-rotor displacement characteristic for a rotatable transformer specially constructed so as to have a linear output characteristic over a predetermined useful range of rotor displacements;

Fig. 3 illustrates the various phase outputs which may be obtained from a rotatable transformer for various rotor displacements;

Fig. 4 is a schematic circuit diagram of a basic total fluid flow indicating system incorporating linear-output type rotatable transformers in accordance with the present invention.

Fig. 5 is a diagrammatic illustration of one form of transmitter arrangement with one form of fluid flow metering means for sensing the flow through a conduit;

Fig. 6 is a front view of a dial for indicating the fluid flow sensed by metering means such as that illustrated in Fig. 5;

Fig. 7 is a front view of a dial for indicating the total flow of fluid through a plurality of conduits;

Fig. 9 represents graphically for each transmitter unit of Fig. 8 the relationship between the output voltage from the unit and the rotor displacement of the rotatable transformer in the unit;

Fig. 10 represents graphically for each transmitter unit of Fig. 8 the linear relationship obtained between the output voltage from the unit and the fluid flow through the associated conduit;

Fig. 11 represents graphically for the bucking unit of Fig. 8 the relationship between the output voltage from the unit and the rotor displacement of the rotatable transformer in the unit and illustrated how the linear range of the rotatable transformer for a fixed phase output from the unit is effectively extended;

Fig. 12 represents graphically for the bucking unit of Fig. 8 the linear relationship obtained between the rotor displacement of the rotatable transformer in the unit and the total flow of fluid through the plurality of conduits;

Figure 8:
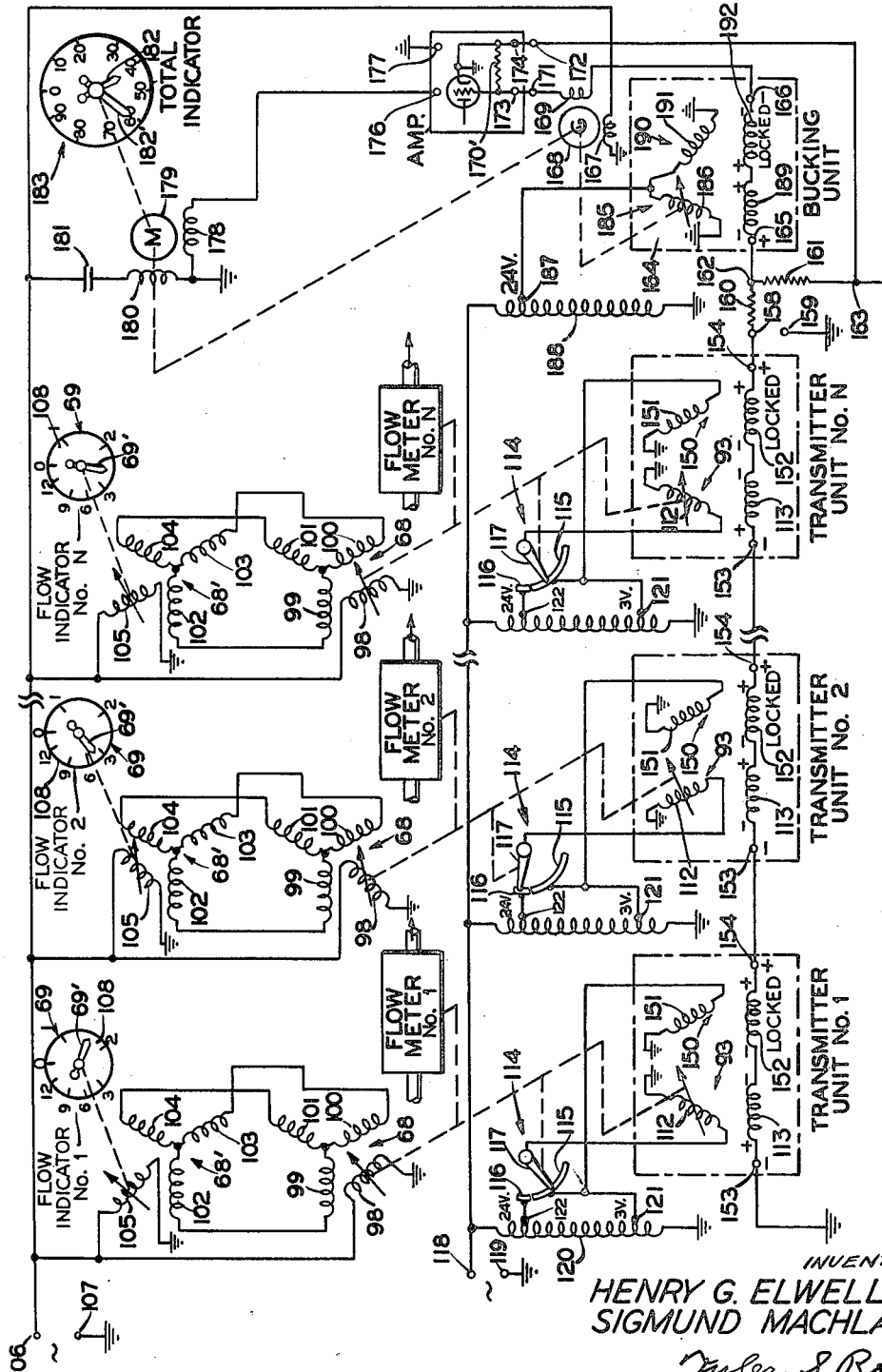
Fig. 8 is a schematic circuit diagram of a total fluid flow indicating system employing a plurality of transmitters which may be of the type illustrated in Fig. 5 and the indicator dials of Figs. 6 and 7.

The curve of Fig. 1 represents the relationship in a conventional rotatable transformer between the secondary voltage and rotor displacement for an A. C. excitation voltage of constant magnitude applied to the primary winding. It can be seen that the variation in secondary voltage with rotor displacement follows a sine law rather than a linear law. For a very limited range of rotor displacements, less than 15°, about the zero-output rotor position it will be observed that the relationship is only approximately linear at best. When the rotor is displaced to its null position wherein the primary and secondary windings are effectively at right angles to each or 90° displaced so that there is minimum coupling therebetween or minimum flux linkage of the secondary winding, as indicated diagrammatically by primary winding 10 and secondary winding 11 in Fig. 3a, then the secondary voltage will be zero as indicated at the 0° point in Fig. 1. In Fig. 1 and Fig. 3 instantaneous polarities are shown so as to indicate relative phase relationships for the various relative winding positions. When the rotor is displaced through an acute angle to an intermediate position on one side of its null or minimum coupling position so that the windings are effectively at an angle other than 90° as shown in Fig. 3b, then the secondary voltage will have an intermediate magnitude and will be of one phase as indicated by the positive half of the sine curve of Fig. 1; and when the rotor is displaced through a larger angle on the same one side of its null position so that it is displaced 90° from its null position and the windings are effectively parallel to each other for maximum coupling or maximum flux linkage of the secondary winding as shown in Fig. 3c, then the secondary voltage will have the same one phase and will have a maximum magnitude as indicated by the peak of the positive half of the curve of Fig. 1.

Similarly, when the rotor is displaced on the other side of its null position so that the windings are effectively displaced as indicated in Fig. 3d and Fig. 3e for intermediate and maximum coupling respectively, then the secondary voltage will have an intermediate and maximum magnitude, respectively, and a phase opposite to the phase of the secondary voltages obtained for the positions of Fig. 3b and Fig. 3c.

In view of the considerations previously discussed, the present invention in one aspect contemplates the provision of a system for measuring or indicating the total flow of fluid through a plurality of conduits wherein there is utilized a particular type of rotatable transformer which is specially constructed so as to have an output voltage-rotor displacement characteristic wherein the secondary voltage is substantially a linear function of the angular displacement of the rotor over a relatively wide useful range of displacements of the rotor from its null position. A rotatable transformer having such a linear characteristic shall hereinafter be referred to in the specification and claims as a linear-output type rotatable transformer. The output voltage-rotor displacement characteristic or variation for one construction of a linear-output type rotatable transformer is represented in Figure 2 by a curve of substantially triangular shape. It will be observed that the secondary voltage is substantially proportioned to the rotor displacement for displacements of the rotor up to at least 60° on either side of its null or zero-output position.

A recently devised construction of linear-output type rotatable transformer which may be utilized in accordance with the present invention employs two relatively moveable core members which define an air gap with a primary winding on one core member and a secondary winding on the other core member wherein the primary winding is arranged to distribute the flux in the gap so that the flux linkage of the secondary winding varies linearly over a working range of angular rotor displacements. For example, where a relatively wide linear range of rotor displacements is required, the primary winding may be arranged to provide a flux which is non-uniformly distributed along the gap so that the flux density in the gap varies at a uniform rate over each pole face and along the gap. This construction may be accomplished by starting with a certain number of turns at one end of one pole face and progressively increasing the number of turns toward the other end or by providing a variable gap and uniform windings therearound. In this construction a concentrated secondary winding may be employed having a pitch which is a fraction of the pitch of the primary winding.

A preferred construction of linear-output type rotatable transformer which may be utilized in apparatus according to the present invention is described in detail in the pending application of P. G. Yeannakis and S. C. Lapidge Serial No. 435,482, filed June 9, 1954, and assigned to the same assignee as the present application. In a preferred form this construction is carried out as follows.

First a Fourier mathematical analysis is made of the desired generally triangular curve of the secondary voltage-rotor displacement characteristic to determine the maximum amplitude that is required for the fundamental and for each of the harmonic component voltages which are to be combined to produce the desired triangular secondary voltage variation. In order to provide a proper distribution of the coils comprising the secondary stator winding, the equation for the fundamental component and the equations for each of the odd harmonics are then established in terms of the coupling factor, the number of turns in each coil and the coil slot location with respect to the secondary winding axis. These equations are then solved simultaneously for the values of the number of turns which will be required for coil of one-slot pitch, the coil of two-slot pitch etc. The coils which are distributed in accordance with the above method are then connected in series to form the secondary stator winding. Hence, the fundamental and odd harmonic component voltages of predetermined magnitude are added to produce the desired triangular curve of the secondary voltage-rotor displacement characteristic.

A basic total fluid flow indicating system in accordance with the present invention is illustrated schematically in Fig. 4. The system of Fig. 4 as hereinafter described is characterized by a novel mode of operation which produces a high degree of sensitivity and accuracy. By way of example in Fig. 4 it is assumed that it is desired to measure accurately the total of the rates flow through four conduits 12, 13, 14 and 15. Conduits 12–15 may be the four fuel lines which supply the respective engines of a four-engine aircraft, for example. In series with each conduit is a respective flowmeter for sensing the fluid flow through the associated conduit. The flowmeters may be of a known type, such as those employing a vane for example, wherein the output displacement is substantially a linear function of the rate of flow through the conduit over the full range of flows. Associated with each flowmeter is a separate transmitter unit.

Each transmitter unit has a linear output type rotatable transformer indicated generally at 16, 17, 18 and 19, respectively. At 20 and 21 are conductors which are connected to terminals 22 and 23, respectively. Terminals 22 and 23 are adapted for connection to a source of A. C. voltage, not shown. Connected in parallel across conductors 20 and 21 are primary windings 24, 25, 26 and 27 wound on respective rotors of the four rotatable transformers. Inductively coupled with a respective primary winding are the secondary stator windings 28, 29, 30 and 31. The secondary windings are connected in the transmitter unit output circuits between the unit output terminals 32—33, 34—35, 36—37 and 38—39, respectively. For the purpose of describing the operation of Fig. 4 it will be assumed that rotatable transformers 16—19 are each constructed so that the secondary voltage is proportional to angular rotor displacement over a range of rotor displacements up to at least 55° on either side of the rotor's null position. The rotor of each transformer is responsively coupled to the output of the associated flowmeter so that the rotor will be located at its null position, that is with the primary and secondary windings effectively 90° displaced for minimum coupling therebetween and zero secondary voltage, when there is minimum or zero flow through the associated conduit and so that with fluid flow the rotor will be angularly displaced on one side of its null position to an extent proportional to the instantaneous fluid flow through the associated conduit and will occupy an angular position for maximum fluid flow through the associated conduit which is 55° displaced from its null position. The polarities shown in Fig. 4 indicate the relative phases of the various voltages. By this construction there is developed across the secondary winding of each transformer, and hence across the output terminals of each transmitter unit, an A. C. voltage always of the same fixed phase and of an instantaneous magnitude directly proportional to the instantaneous flow through the associated conduit.

The output terminals of the four transmitter units are connected in series-aiding relationship in a circuit between ground and a terminal 40 so that there is developed between terminal 40 and grounded terminal 40' a resultant voltage of a magnitude which is the algebraic sum of the magnitudes of the output voltages of the four transmitter units. Hence, the voltage appearing between terminal 40 and ground is directly proportional to the total of the rates of flow of fluid through the four conduits.

Terminal 40 is connected by means of a conductor 41' to a terminal 41 at the input to an indicator station designated generally at 43. Therefore, the resultant voltage between terminals 40 and 40' also appears across terminal 41 and ground terminal 42 at the input to the indicator station 43. At the indicator station there is provided a bucking unit 44, an amplifier 45, a reversible motor 46 and a total fluid flow indicator 47. Bucking unit 44 serves as a balancing unit for automatically balancing the series circuit which can be traced from ground through the transmitter unit output circuits between terminals 32 and 39, over conductor 41', through the bucking unit output circuit between output terminals 48—49 and back to ground through the amplifier input impedance represented by resistance 50. Bucking unit 44 has a linear-output type rotatable transformer indicated generally at 51. Transformer 51 may be constructed in the same manner as transformers 16—19 so that when its primary winding 52 is energized the voltage developed across its secondary winding 53 is proportional to its angular rotor displacement over a predetermined range, for example, up to 55° on either side of the rotor's null position.

Connected to terminals 54 and 55, respectively are conductors 56 and 57. Primary winding 52 is connected for energization across conductors 56 and 57. Terminals 54 and 55 may be adapted for connection to a source of A. C. voltage of the same frequency as the source connected to the terminals 22 and 23. The rotor of transformer 51 is arranged for displacement by motor 46 through its linear range on only one side of its null position so that the voltage developed across its secondary winding 53 will have a fixed phase which is substantially 180° displaced at all times from the fixed phase of the resultant voltage across terminals 41 and 42.

If transformer 51 is constructed like transformers 16—19 so that it has a linear output only up to 55° displacement of its rotor from the null position and if each of the transformers 16—19 is arranged to be driven by its flowmeter to cover the full 55° linear range from null position, then the energization voltage applied to primary winding 52 of the bucking transformer 51 should be approximately four times greater than the voltage applied to primary windings 24—27 so that the range of bucking voltages will equal the range of resultant voltages appearing across terminals 41 and 42; alternatively, the same result may be obtained by supplying terminals 22, 23 and 54, 55 from the same A. C. source and interposing a 4 to 1 step-down voltage divider between terminals 40, 41 and 42 as shown, for example, in the system of Fig. 8 so that the voltage appearing across terminals 41 and 42 will always be approximately one fourth of the resultant voltage developed between terminal 40 and grounded terminal 40'. Similarly, if the transformers 16—19 are arranged to be driven so as to cover a predetermined range of displacements less than the full 55° range, then it will be obvious to those in the art what voltage magnitude must be applied to primary winding 52 or, alternatively, what voltage-divider step-down ratio must be employed if it is desired to employ the same energization source for transformer 51.

Amplifier 45 may be of a conventional type and may include a conventional phase-discriminating network.

Reversible motor 46 may be of the two-phase squirrel-cage induction type having its control winding 58 connected between the amplifier output terminals 59, 60 and its fixed-phase power winding 61 energized from supply terminals 54, 55 via conductors 56 and 57 and phase-shift condenser 62. The rotor of motor 46 is coupled through suitable reduction gearing to the rotor of transformer 51 and also to the pointer 63 of indicator 47 which has its dial calibrated linearly in units of total rate of fluid flow, such as cubic feet per minute or pounds per hour.

The operation of the system of Fig. 4 is as follows. When there is minimum or zero flow of fluid through each of the four conduits, the rotors of transformers 16—19 are each located at their null or minimum coupling position so that the voltage across each of the secondary windings 28—31 is zero. The rotor of transformer 51 also will be located at its null position so that zero voltage appears across secondary winding 53 and also across the output terminals 48, 49 of the bucking unit. Accordingly, zero voltage appears across the output terminals 64, 65 of the series circuit and hence also across the amplifier input terminals 66, 67 and the amplifier input impedance 50. Thus, no control signal is supplied by the amplifier to the control winding 58. Motor 46 is therefore at rest with pointer 63 indicating minimum or zero total fluid flow.

Assume now that fluid begins to flow through conduit No. 1, for example, and that the flow reaches a magnitude which is one half of the maximum possible flow through conduit No. 1. The rotor of transformer 16 will thus be angularly displaced 27.5° from its null position so that primary winding 24 will be effectively at an angle of 62.5° with respect to secondary winding 28. Because transformer 16 is a linear-output rotatable transformer the magnitude or amplitude of the A. C. voltage which will be developed across secondary winding 28 and output terminals 32, 33 will be one half the magnitude of the maximum voltage which would be developed across secondary winding 28 with maximum flow through conduit No. 1 causing the rotor to be displaced 55° from its null position. Assuming there is zero or minimum flow through the other conduits, the A. C. voltage of one phase developed across terminals 32, 33 will also be the resultant voltage which is applied across output terminals 40, 40' and across the input terminals 41, 42 at the indicator station.

Turning back for a moment to the condition where fluid first begins to flow in conduit No. 1, the resultant voltage of one phase applied across terminals 41, 42 will also appear as an unbalance voltage of the same phase arcoss the output terminals 64, 65 of the series circuit and hence across the input terminals 66, 67 to the amplifier, since the rotor of transformer 51 is still at a null position with zero voltage induced in the secondary winding 53. A control signal voltage of one phase will thus appear across the amplifier output terminals 59, 60 and will be applied to the control winding 58 of the motor. The motor will therefore begin to rotate and drive the rotor of transformer 51 from its null position in a direction which results in a follow-up voltage being developed across secondary winding 53 which has a phase opposite to, that is substantially 180° displaced from, the phase of the resultant voltage applied across terminals 41, 52 so as to buck the resultant voltage, the instantaneous magnitude of the follow-up bucking voltage always being substantially equal to the instantaneous magnitude of the resultant voltage as the resultant voltage increases from zero since transformer 51 is a linear-output rotatable transformer resulting in proportional incremental voltage increases developed across secondary 53 in response to incremental changes in the resultant voltage.

When the magnitude of the rate of flow through conduit No. 1 has increased to one half of the maximum magnitude and the flow remains constant at that rate, then no further difference will occur between the magnitudes of the follow-up bucking voltage and the resultant voltage and hence the series circuit is rebalanced so that an unbalance voltage will no longer appear across terminals 64, 65 across the input to the amplifier and a control signal will no longer be applied to the motor. Hence, the motor will stop and pointer 63 will accurately indicate that the total flow through all four conduits is one eighth of the maximum total flow, that is assuming the maximum flow through each of the conduits is the same.

Assume now that the rate of flow through conduit No. 1 decreases from one half of maximum flow to one quarter of maximum flow and that there is no flow in the other conduits. Flowmeter No. 1 will then angularly displace the rotor of transformer 16 in a direction back toward its null position so that the voltage induced in secondary winding 28 will proportionately decrease with decrease in flow but will have the same fixed phase as the voltage induced in winding 28 during an increase in flow.

As soon as the flow in conduit No. 1 starts to decrease the series circuit becomes unbalanced, since the instantaneous resultant voltage of one phase applied across terminals 41, 42 becomes less than the instantaneous bucking voltage of opposite phase developed across the output terminals 48, 49 of the bucking unit 44. Thus there is developed across the output terminals 64, 65 across the input to the amplifier an unbalance voltage which has substantially the same phase as the bucking voltage and substantially 180° out of phase with the resultant voltage. Since the unbalance voltage has a phase opposite to the phase of the unbalance voltage produced when the flow increases, a control signal voltage will be applied to the motor control winding 58 from the amplifier which has a phase opposite to the phase of the control signal produced when the flow increases. The motor will therefore rotate in a reverse direction to drive the rotor of transformer 51 in the reverse direction back towards its null position so that the bucking voltage induced in secondary winding 53 will decrease linearly with decrease in the applied resultant voltage but will have the same phase as it had when the flow increased. When the fluid flow has decreased to one quarter of its maximum rate of flow and continues constant at this rate, the magnitude of the resultant voltage and the bucking voltage will be equal and hence there will no longer be an unbalance voltage applied to the amplifier input. The motor will thus come to rest to hold the rotor of transformer 51 displaced 13.75° from its null position and to position pointer 63 so that it accurately indicates the total flow through all of the conduits to be one sixteenth of the maximum total flow.

When there is fluid flow through two or more of the conduits the rotors of the corresponding transformers are displaced corresponding amounts on the same one side of the null position so that the voltages induced in the secondary windings 28–31 are always in phase and aid each other. Thus, as stated previously, the resultant voltage appearing between terminals 40, 40' and between terminals 41, 42 at any moment has a magnitude or amplitude which is equal to the algebraic sum of the magnitudes of the output voltages of the four transmitter units and is directly proportional to the total rate of flow for all four conduits. Since the phase of these output voltages is always the same, the phase of the resultant voltage remains constant over the entire range of total fluid flows as does the opposite phase of the bucking voltage. When the total flow and resultant voltage change in magnitude to unbalance the system, the system functions to yield a precise indication of total flow in the same manner as previously described in connection with the case where there was assumed to be flow in only conduit No. 1.

If desired, a conventional anti-hunt network including a rate generator may be employed at the indicator station of the system of Fig. 4 to minimize hunting of the motor 46 about its various rest positions. The anti-hunt arrangement may be the same as that employed in the system in Fig. 8, the generator having its rotor driven by the motor and having its output connected to introduce in the series circuit a relatively small anti-hunt voltage of a phase opposite to the unbalance voltage applied to the amplifier input.

In the basic system illustrated in Fig. 4 it is assumed that the vane or other sensing means in each of the flowmeters has a displacement characteristic wherein its displacement changes the same amount per unit change in flow through the associated conduit in the lower flow range, for example, a flow range between zero and 300 pounds per hour, as its change in displacement per unit change in flow in the upper flow range, for example, a flow range between 300 and 1200 pounds per hour. However, in some applications this is not true. For example, in a fuel flow indicating system for multi-engine aircraft it is desirable to obtain a separate indication of the fuel flow to each of the engines as well as an indication of the total fuel flow to all of the engines. Fig. 8 illustrates a system for obtaining both of these indications. If the dial for each of the individual indicators is to provide the desirable feature of a more sensitive or expanded indication in the lower range between zero and 300 pounds per hour for example as illustrated in Fig. 6, then a double-range flowmeter may be employed which has a different displacement characteristic in the lower and upper ranges.

Such a flowmeter is illustrated in Fig. 5.

Turning briefly to Fig. 8, let it be assumed that the flow through eight conduits is to be measured and thus flowmeter No. N is the eighth and last flowmeter. It is to be noted that the output of each flowmeter is not only driveably coupled through reduction gearing to the rotor of a respective rotatable linear-output transformer 93 in the totalizing system but also is driveably coupled through step-up gearing to the rotor of a respective synchro transmitter 68 in a respective indicator synchro system for indicating the flow through the associated conduit. As shown in Fig. 6 the individual indicator in each synchro system has an expanded scale portion for the flow range between zero and 300 pounds per hour which occupies eight times more dial space than the scale portion for the flow range between 300 and 1200 pounds per hour. By employing a double-range flowmeter such as illustrated in Fig. 5 the pointer 69' of each individual indicator 69 is arranged to be displaced eight times farther per unit change in fluid flow in the 0–300 lower range than it is displaced per unit change in fluid flow in the 300–1200 upper range, thus providing the desired expanded indication in the lower range as will be described in greater detail hereinafter.

Considering the transmitting arrangement of Fig. 5 in detail there is designated generally at 70 a fuel flow transmitter including a fuel flowmeter 71, shown cut vertically in half, and a conventional magnetic coupling device 72. The transmitting arrangement illustrated in Fig. 5 may be associated with each of the conduits in the system of Fig. 8. Flowmeter 71 comprises a housing 73 having a chamber 74 formed therein and provided with a fuel inlet port 75 and a fuel outlet port 76. Ports 75 and 76 are adapted for connection in series with the associated conduit so that inlet port 75 receives fuel from the fuel source and outlet port 76 provides an exit for passage of the fuel to the associated engine.

Eccentrically mounted with respect to the chamber 74 is a shaft 77. A vane 78 is fixedly attached to the shaft by means of a hub 78'. A rib portion of the housing prevents fuel from by-passing the vane. A spiral calibration spring 79, having one end 80 fixed in position and the other end 81 secured to shaft 77, serves to bias the shaft and vane in a counter-clockwise direction so that when there is zero or minimum flow through port 75 the tip end of the vane will be located adjacent to point $a$ on the curved wall surface 82 of chamber 74. When fuel enters port 75 at an increasing rate the vane and shaft are displaced in a clockwise direction from point $a$ towards point $b$ on surface 82, surface 82 being contoured in a spiral manner so that the separation distance between the tip end of the vane and surface 82 increases progressively as the vane is moved closer to point $b$. In this manner the angular displacement of the vane from its zero position opposite point $a$ is made directly proportional to the rate of flow. When the rate of flow is 300 pounds per hour for example, the vane and shaft 77 will be displaced so that the vane is located adjacent to point $b$.

Further increase in the rate of flow will cause the vane to be displaced beyond point $b$ along the curved wall surface 83 towards point $c$, surface 83 being similarly contoured so that the separation distance between the tip end of the vane and surface 83 progressively increases as the vane is moved from point $b$ to point $c$. In this manner the angular displacement of the vane and shaft 77 is again made directly proportional to the rate of flow, and when the flow is maximum at 1200 pounds per hour for example, the vane will be displaced so as to be located adjacent to point $c$. However, as shown in Fig. 5, all of the points along surface 83 between points $b$ and $c$ are located at a greater distance from the tip end of the vane when it is adjacent such points than are the points between points $a$ and $b$ on surface 82. By virtue of this difference between surfaces 82 and 83 the displacement of the vane per unit change in fluid flow in the lower flow range between zero and 300 pounds per hour is made eight times greater than its displacement per unit change in fuel flow in the upper flow range between 300 and 1200 pounds per hour. In other words, the output displacement vs. fuel flow characteristic of flowmeter 71 is made to follow one linear law in the lower flow range and a different linear law involving a different proportionality constant in the upper flow range.

Fixed to shaft 77 is magnet 84 of the magnetic coupling device 72. Magnet 84 is disposed inside a generally ring-shaped magnet 85 for angular displacement with respect to the poles of magnet 85, so that magnet 85 is angularly displaced in response to angular displacement of shaft 77. One end of a shaft 86 is fixed to one end of magnet 85 to be driven thereby and the other end of the shaft carries a pinion gear 87 in driving engagement with a gear 88 which in turn drives a shaft 89 and gears 90 and 91. Gear 91 is mounted on the rotor shaft 92 of the associated transmitter linear-output rotatable transformer 93 and hence the rotor of transformer 93 is displaced as a linear function of the displacement of the vane 78, for example by a gear reduction ratio of approximately four-to-one.

Gear 88 is also arranged to drive a pinion gear 95 which is fixed to the rotor shaft 96 of the associated synchro transmitter 68 so that the rotor of synchro 68 is displaced as a linear function of the displacement of vane 78, for example by a gear step-up ratio of approximately one-to-two. Assuming that the entire range of angular displacements for the vane 78 is 175°, then the vane will be displaced clockwise from point $a$ to point $b$ through an angle of 127.27° when the flow increases in the lower range from zero to 300 pounds per hour and will be displaced from point $b$ to point $c$ through an additional angle of 47.73° when the flow increases into the upper range from 300 to 1200 pounds per hour. With a gear step-up ratio of approximately one-to-two between shafts 86 and 96, the rotor of the associated synchro transmitter 68 will be displaced from an equilibrium or null position through an angle of 240° when the flow increases from zero to 300 pounds per hour and through an additional angle of 90° when the flow increases into the upper range from 300 to 1200 pounds per hour. In this manner the rotor of synchro transmitter 68 is angularly displaced eight times farther per unit change in fuel flow in the lower range than it is displaced per unit change in fuel flow in the upper range.

Turning to Fig. 8 again, it will be observed that in each of the individual synchro indicating systems there is provided an inductive synchro transmitter device 68, an inductive synchro receiver device 68' and an individual flow indicator 69. Synchro transmitter 68 has a rotor winding 98 and so-called three-phase secondary stator windings 99, 100 and 101 which are connected back-to-back in the conventional manner to the corresponding three-phase primary stator windings 102, 103 and 104 of synchro receiver 68'. The rotor windings 98 and 105 of transmitter and receiver 68 and 68', respectively, are adapted to be energized by connection across a pair of terminals 106, 107 which in turn are supplied from a source of alternating voltage (not shown). The rotor of receiver 68' is drivably coupled to the indicator pointer 69' so that the pointer indicates zero flow when the rotor is in a null or zero position, corresponding to the null position of the rotor of transmitter 68 for zero fuel flow through the associated conduit.

In a manner well understood in the art, angular displacement of the rotor of transmitter 68 changes the magnitudes of the voltages induced in stator windings 99, 100 and 101 which is communicated to the corresponding stator windings 102, 103 and 104 of receiver 68' so as to displace the resultant field therein and cause a proportional followup displacement of the rotor of the receiver. As shown best in Fig. 6, the lower-range linearly calibrated scale portion from zero to 300 on the dial 108 of indicator 69 occupies eight times as much dial space as the upper-range linearly-calibrated scale portion from 300 to 1200. Since the rotor of receiver 68' is angularly displaced eight times farther per unit change in flow in the lower range than in the upper range, the pointer 69' will give the desired expanded indication over the lower range. That is, the pointer is eight times more sensitive in the lower range than it is in the upper range.

However, in order to obtain the more sensitive lower-range readings for the individual indicators 69 it was necessary to make the output displacement of the respective flowmeters follow one linear law over the lower flow range and to follow a different linear law over the upper flow range. This means that the input intelligence (i. e., displacement) to the rotor of each of the linear-output type rotatable transformers 93 also follows a different linear law over the lower flow range than it does over the upper flow range. That is, the slope of the displacement vs. flow characteristic is different for the lower and upper range. This means that the voltage induced in the secondary winding of each of the transformers 93 would follow one linear law of one slope relating secondary voltage with fuel flow in the lower flow range and a different linear law of a different slope relating secondary voltage with fuel flow in the upper range. However, the output voltage from a plurality of transmitter units must be added and it is desirable to employ a total flow indicator which has the same uniform linear dial calibration over the entire total flow range from zero or minimum total flow to maximum total flow, that is a dial which has uniformly spaced graduations over the entire total flow range as indicated best in Fig. 7.

It is accordingly another feature of the present invention to provide means now to be described wherein the output voltage from each transformer 93 and from each of the transmitter units follows the same law relating output voltage with fuel flow through the associated conduit in both the lower and upper ranges regardless of the fact that the input intelligence (displacement) to each transmitter unit follows a different law in the two ranges. That is, the characteristic of each transmitter unit relating output voltage with fuel flow through the associated conduit will have the same slope in both the lower and upper flow ranges as indicated graphically in Fig. 10.

The fuel flow totalizing system of Fig. 8 will now be considered in detail. Each of the rotatable linear-output transformers 93 has a rotor with a primary winding 112 wound thereon and a secondary winding 113. Transformers 93 may be constructed in the same manner as the rotatable linear-output transformers 16–19 of the basic system of Fig. 4 so that the voltage developed across secondary winding 113 is a linear function of rotor angular displacement up to 55° on both sides of the null position of the rotor.

With a gear reduction ratio of approximately four-to-one between shafts 86 and 92, the rotor of each transformer 93 will be displaced through an angle of 32.64° when the fuel flow increases from zero to 300 pounds per hour and through an additional angle of 12.24° when the flow increases into the upper flow range from 300 to 1200 pounds per hour.

Associated with each transmitter unit is an automatic switching mechanism represented in a general form at 114. Switch 114 is a single-pole, double-throw switch and in a general form is illustrated in Fig. 8 as including a pair of arcuate electrical contacts 115 and 116 and an electrical contact arm or slider 117 adapted to be displaced as a linear function of the displacement of the vane 78 in the associated flowmeter. This may be accomplished conveniently and with greater accuracy by connecting contact arm 117 so as to be driven by the rotor shaft of the respective synchro transmitter 68. A pair of terminals 118, 119 are provided for connection across a source (not shown) of alternating voltage of the same frequency as the voltage supplied to terminals 106, 107. Associated with a respective switch 114 and connected across terminals 118, 119 is an inductance 120 serving as a voltage divider. Inductance 120 has a tap 121 providing a constant A. C. voltage of three volts with respect to ground and a tap 122 providing a constant A. C. voltage of 24 volts with respect to ground. Contact 115 is connected to tap 121 and contact 116 is connected to tap 122 so that the voltage with respect to ground on contacts 115 and 116 is continuously 3 volts and 24 volts, respectively.

Contact arm 117 is arranged to be in electrical contact with contact 115 when fuel flow through the associated conduit is in the lower flow range between 0 and 300 pounds per hour and in electrical contact with contact 116 when fuel flow is in the upper flow range between 300 and 1200 pounds per hour. Contact arm 117 is connected to the ungrounded side of primary winding 112 so that winding 112 receives a 3-volt excitation when fuel flow is in the lower range and a 24-volt excitation (i. e., 8 times 3 volts) when fuel flow is in the upper range.

The same switching of excitation voltages across primary winding 112 may be accomplished instead by the modified type of single-pole, double-throw switching mechanism 114' illustrated in Fig. 5 and described in greater detail and claimed in the pending U. S. application of James E Bevins, Serial No. 395,462, filed December 1, 1953 and assigned to the same assignee as the present application. Briefly stated, switch 114' includes an electrically conductive metal yoke member 133 having a ring-shaped end portion 134 secured to the end of the housing 135 of synchro transmitter 68 and electrically insulated therefrom, the yoke being shown separated from the housing in Fig. 5. Supported by yoke 133 is a first pair of stationary electrical spring contact members 136, 137 insulated from each other at their other ends. Also supported by yoke 133 is a second pair of stationary electrical spring contacts 139, 140 insulated from each other by insulation member 141 at their ends secured to the yoke and urged by their own resiliency into contact with each other at their other ends. Contact 136 is permanently connected to the 24-volt tap 122 and contact 139 is permanently connected to the 3-volt tap 121. Contacts 137 and 140 are in permanent electrical contact with metal yoke 133 which in turn is connected by conductor 142 to terminal 143 at the input to the rotatable linear-output transformer 93. Terminal 143 and grounded terminal 144 are connected across primary winding 112 of transformer 93. Fixed to the end of rotor shaft 96 is a relatively thin cam disc 145 of suitable electrical insulation material. The contact-making ends of contacts 136 and 137 are positioned closer to shaft 96 than the contact-making ends of contacts 139 and 140. Cam disc 145 is contoured as shown so that when the fuel flow through the associated conduit increases in the lower range from zero to 300 pounds per hour the cam disc is displaced through 240° but remains interposed between the pair of contacts 136, 137 to keep them open while at the same time the pair of contacts 139, 140 are out of contact with the cam disc and hence remain closed to apply the required 3-volt excitation to primary winding 112. When the fuel flow increases into the upper range from 300 to 1200 pounds per hour cam disc 145 is displaced through an additional 90° during which time the disc is out of contact with the pair of contacts 136, 137 and hence they make contact to apply the required 24-volt excitation to primary winding 112, the disc being interposed between the pair of contacts 139, 140 during this time so that they are held apart.

It will thus be seen that the switching mechanism 114 or 114' provides electrical compensation for each transmitter unit to compensate for the fact that the rotor of each rotatable linear-output transformer 93 is displaced eight times farther in the lower flow range than in the upper flow range. This compensation in the system of Fig. 8 is accomplished by energizing the primary winding 112 of transformer 93 when fuel flow is in the lower range with a voltage which is only one eighth the magnitude of the excitation voltage applied to winding 112 when fuel flow is in the upper range.

In accordance with a feature of the present invention means are provided to minimize or substantially eliminate voltage fluctuations and hence pointer fluctuations in the system produced at the moment of automatic switching from the 3-volt to the 24-volt excitation for primary winding 112. Each of the transmitter units of the system of Fig. 8 includes an additional rotatable linear-output transformer 150 which has its primary winding 151 permanently connected between the 3-volt tap 121 and ground and has its secondary winding 152 connected in series with secondary winding 113 between the output terminals 153, 154 of the transmitter unit. When there is zero or minimum flow through the associated conduit the rotor of each transformer 93 is adapted to be displaced 32.64° on one side of its null position to develop a voltage of one phase in secondary winding 113. The rotor of each of the transformers 150 carrying primary winding 151 is locked at an angular position 32.64° on the other side of its null position so that with zero fuel flow the voltages developed in secondary windings 113 and 152 are equal in magnitude but substantially 180° out of phase whereby zero voltage appears across the output terminals 153, 154 of the transmitter unit.

In Fig. 9 curve A represents the voltage of constant magnitude and phase developed across secondary winding 152. Curve B represents the voltage developed across secondary winding 113 for the various displacements of the rotor of transformer 93. Curve C is a composite of curves A and B and represents the output voltage which appears across output terminals 153, 154 of the transmitter unit and which has a magnitude or amplitude equal to the algebraic sum of the magnitudes of the voltages appearing across secondary windings 113 and 152. As fuel flow through the associated conduit begins to increase progressively from zero or a minimum value, the rotor of transformer 93 will be displaced proportionally towards its null position and hence the voltage developed across secondary winding 113 will decrease proportionally in magnitude but remain of the same phase which is substantially 180° out of phase with the phase of the voltage across secondary winding 152. The transformer 93 of transmitter units No. 1 and No. N of Fig. 8 are shown displaced in this range.

When the flow has reached 300 pounds per hour the switching mechanism automatically switches over from a 3-volt to a 24-volt energization for primary winding 113, but such switching operation will not cause a voltage fluctuation across secondary winding 113 since the rotor of transformer 93 is intentionally arranged to be located at its null or minimum coupling position when a flow of 300 pounds per hour is reached. This point in the operation is indicated in Fig. 9 at the point where curve B passes through the origin, indicating zero rotor displacement from the null position and zero voltage developed across secondary winding 113. Hence at this point the voltage (curve C) appearing across the output terminals 153, 154 of the transmitter unit is equal in magnitude to the voltage developed across secondary winding 152.

When the flow increases progressively from 300 pounds per hour into the upper flow range the rotor of transformer 93 is displaced on the opposite side of and away from its null position so that a voltage of proportionally increasing magnitude is developed in secondary winding 113, this voltage now being reversed in phase and hence serving to supplement the constant voltage which appears across secondary winding 152 so that the total of the two secondary voltages appears across output terminals 153, 154. Transformer 93 of unit No. 2 in shown displaced in this range.

By the above arrangement each transmitter unit output voltage across output terminals 153, 154 remains fixed in phase over the entire flow range, being the same as the phase of the voltage developed across winding 152, irrespective of the fact that the rotor of transformer 93 is displaced on both sides of its null position to reverse the phase of the voltage developed across secondary winding 113. The above arrangement provides an A. C. output voltage across the output terminals 153, 154 of each transmitter unit which is not only fixed in phase but also is the same linear function of fuel flow through the associated conduit in both the lower and upper flow ranges as indicated graphically in Fig. 10.

Since the transmitter unit output voltages appearing across all of the pairs of output terminals 153, 154 are of the same fixed phase over the entire total flow range, the resultant A. C. voltage appearing between terminal 158 and grounded terminal 159 has a magnitude equal to the sum of the magnitudes of all of the transmitter unit output voltages and hence directly proportional to the total rate of fuel flow through all of the conduits.

Assuming that each transmitter unit develops across the output terminals 153, 154 one volt per 100 pounds of fuel per hour, then the maximum output voltage from each transmitter unit will be 12 volts. Assuming further that there are 8 transmitter units, then the maximum resultant voltage developed between terminals 158, 159 will be 96 volts. By providing a suitable voltage-dividing network comprising a resistor 160 having a resistance of 70,000 ohms and a resistor 161 having a resistance of 100,000 ohms, the maximum voltage appearing between terminal 162 and grounded terminal 163 will be stepped down to 67.2 volts.

Completing a series circuit between terminal 162 and ground is the output circuit of a bucking unit 164 between its output terminals 165, 166, the output winding 169 of a conventional rate generator 168 and the input impedance of an amplifier 170 represented by resistance 170'. Rate generator 168 may be employed in the conventional manner as previously described. It has its control winding 167 energized from terminals 106, 107 to develop a small rate voltage in winding 169 which is substantially 180° out of phase with any unbalance voltage appearing at the input tof the amplifier.

Broadly speaking, the operation of bucking unit 164 as a unit is generally the same as the operation of bucking unit 44 as a unit in the basic system of Fig. 4. Whenever the totalizing system of Fig. 8 is balanced, bucking unit 164 develops across its output terminals 165, 166 an A. C. bucking voltage which has a phase substantially 180° out of phase with the phase of the resultant voltage appearing across terminals 158, 159 or terminals 162, 163 and has a magnitude equal to the magnitude of the step-down resultant voltage appearing across terminals 162, 163, neglecting the relatively small anti-hunt voltage developed across winding 167 of rate generator 168. Hence, when the system is balanced no voltage appears across the output terminals 171, 172 of the series circuit or across terminals 173, 174 at the input to the amplifier and thus no control voltage appears across the output terminals 176, 177 of the amplifier. Hence, no control signal is applied to the control field winding 178 of reversible motor 179 and it will be at rest at an angular position corresponding to the magnitude of the bucking voltage. Motor 179 may be the same as motor 46 of Fig. 4 and has its power field winding 180 energized from terminals 106, 107 via a series phase-shift condenser 181. The rotor of motor 179 is coupled to the pointer 182 of the total flow indicator 183 so that the angular position of pointer 182 corresponds to the position of motor 182 and to the magnitude of the bucking voltage.

Bucking unit 164 includes two rotatable linear-output transformers 185 and 190 which may be constructed in the same manner as the transmitter transformers 93. Transformers 185 and 190 have respective primary windings 186 and 192 energized from a 24-volt tap 187 on an inductance 188 connected across the voltage supply terminals 118, 119. For angular displacements of the rotors of transformers 185 and 190 up to 55° on either side of their null positions the voltage developed in their respective secondary windings 189 and 192 is a linear function of rotor displacement. Secondary windings 189 and 192 are connected in series between the output terminals 165, 166 of the bucking unit. When the total fuel flow is zero or at a minimum value so that there is a zero resultant voltage between terminals 158 and 159 and between terminals 162 and 163, then the rotor of transformer 185 is arranged to be positioned by motor 179 so that it is displaced 55° on one side of its null position to develop in its secondary winding 189 a voltage which has a magnitude of 33.6 volts and of the same phase as the fixed phase of the transmitted resultant voltage. The rotor of transformer 190 carrying primary winding 191 is locked at an angular position displaced 55° on the other side of its null position so that there is developed in secondary winding 192 a voltage which has a magnitude of 33.6 volts and has a fixed phase substantially 180° out of phase with the phase of the transmitted resultant voltage. Therefore, when the total fluel flow is zero and the stepped-down transmitted resultant voltage appearing across terminals 162 and 163 is zero, the bucking voltage developed across the output terminals 165, 166 of the bucking unit will also be zero. This point in the operation is indicated graphically in Fig. 11 by the intersection of curve F with the horizontal axis. In Fig. 11 curve D represents the constant voltage developed across the secondary winding 192 of the locked transformer 190. Curve E represents the voltage developed across the secondary winding 189 for the various angular positions of the rotor of transformer curve F is a composite of curves D and E and represents the output bucking voltage developed across output terminals 165, 166 and has a magnitude equal to the algebraic sum of the magnitudes of the voltages appearing across secondary windings 189 and 192.

As the total fuel flow beings to increase progressively from zero the stepped-down transmitted resultant voltage applied across terminals 162, 163 also appears as an unbalance voltage across terminals 171, 172 and across terminals 173, 174 at the input to the amplifier to cause rotation of motor 179 and displacement of the rotor of the follow-up transformer 185 towards its null position which causes the voltage across secondary winding 189 to decrease proportionally until the rotor reaches its null position when the total rate of fuel flow is one half of the maximum total rate of flow which is indicated in Fig. 11 by the intersection of curve E with the horizontal axis. When the total flow increases to a value greater than one half of its maximum value the rotor of transformer 185 is displaced on the other side of its null position and hence the voltage developed in secondary winding 189 proportionally increases in magnitude and reverses its phase so that it now supplements the voltage developed in secondary winding 192 as indicated in Fig. 11. When the total fuel flow is maximum a bucking voltage of 67.2 volts bucks out the stepped down transmitted resultant voltage of 67.2 volts. It can be seen that the provision of the second rotatable linear-output transformer 190 in the bucking unit serves effectively to double the linear operating range of displacements of transformer 185 while maintaining the necessary fixed phase for the output bucking voltage delivered by the bucking unit from its output terminals. This feature is particularly valuable where many transmitter units are employed producing a wide range of resultant voltages which must be bucked out. Fig. 12 represents graphically the linear relationship which is obtained between the angular displacement of the rotor of transformer 185 and total fuel flow and hence illustrates the linear indication of total flow that is provided by pointer 182 of the total flow indicator 183. Motor 179 is also arranged to drive a second pointer 182' of indicator 183 so that the change in displacement of pointer 182' with change in total flow is always ten times the change in displacement of pointer 182. In other words, pointer 182' serves as a vernier for the indication given by pointer 182.

Various modifications of the apparatus of Fig. 8 will be apparent. For example, in Figs. 13 and 14 two different modifications of the transmitter unit are illustrated for providing a transmitter unit output voltage which is the same linear function of fuel flow over the entire range of fuel flows through the associated conduit as indicated in Fig. 10 even though the rotor of the transmitter rotatable transformer is displaced eight times farther in the lower range than in the upper range.

Figure 13:
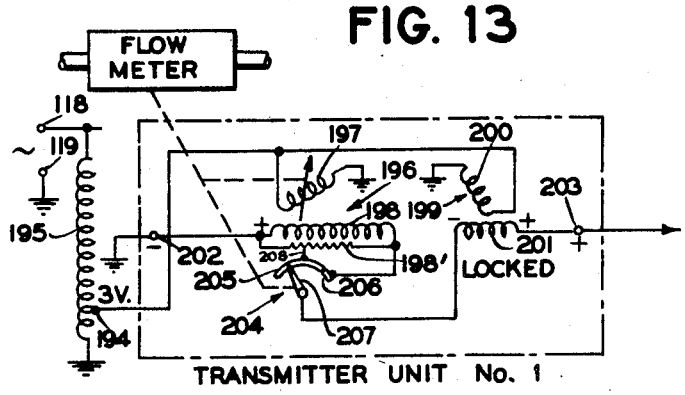
Fig. 13 illustrates a modified form of transmitter unit which may be employed in lieu of the transmitter units of Fig. 8.

In Fig. 13 the transmitter unit includes two rotatable linear-output transformers 196 and 199 having primary windings 197 and 200, respectively, energized from a 3-volt tap on an inductive voltage divider 195 connected across supply terminals 118, 119. Transformer 199 may have its rotor locked to develop a voltage of fixed phase and magnitude across secondary winding 201 in the same manner as the locked transformers 150 of Fig. 8. In Fig. 13 a switching mechanism 204 is associated with the secondary winding 198 of the rotatable transformer rather than with the primary winding as in Fig. 8. Connected across secondary winding 198 is a resistor 198' having a fixed intermediate tap 208 so that the voltage between tap 208 and ground is one eighth of the voltage across winding 198. A switching mechanism 204 is provided which may be similar to the switches 114. Arcuate contact 205 is connected to the tap 208 and arcuate contact 206 is connected to the ungrounded end of secondary winding 198 and resistor 198'. Contact arm 207 is displaced by the flowmeter and is connected to one end of secondary winding 201.

When fuel flow through the associated conduit is in the lower range contact arm 207 will engage contact 205 so that a voltage less than the fixed voltage across winding 201 and proportional to fuel flow and of a phase substantially 180° out of phase with the fixed voltage is algebraically added in series with the fixed voltage, so that the output voltage across output terminals 202, 203 is directly proportional to fuel flow and in phase with the voltage across winding 201.

When fuel flow increases into the upper flow range contact arm 207 is moved into electrical contact with contact 206 so that a voltage proportional to fuel flow (but with a proportionality constant eight times greater than in the lower range) and in phase with the fixed voltage across secondary winding 201 is added in series with the fixed voltage to supplement the latter. Thus, the transmitter unit of Fig. 13 provides an output voltage across terminals 202, 203 which is the same linear function of fuel flow in both the lower and upper ranges as indicated in Fig. 10.

Figure 14:
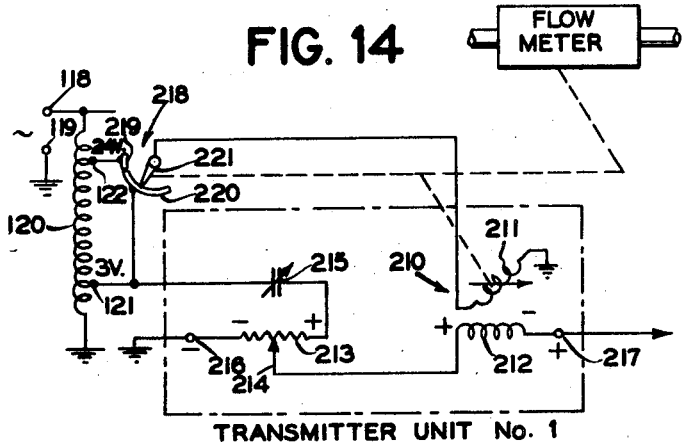
Fig. 14 illustrates another modified form of transmitter unit which may be employed in lieu of the transmitter units of Fig. 8.

In the transmitter unit of Fig. 14 the rotatable linear-output transformer 210 and the switching mechanism 218 correspond, respectively, to the transformer 93 and switching mechanism 114 of Fig. 8. However, in the unit of Fig. 14 the locked transformer 150 is replaced by a potentiometer 213 connected via the adjustable phasing condenser 215 across the 3-volt tap 121 and ground. Slider 214 is initially adjusted and then locked in position so that the voltage between slider 214 and ground has a constant magnitude and phase corresponding to the constant voltage developed across transformer 150 in Fig. 8. Here again, the voltage appearing across output terminals 216, 217 will be the same linear function of fuel flow in both the lower and upper flow ranges as indicated in Fig. 10.

Figure 15:
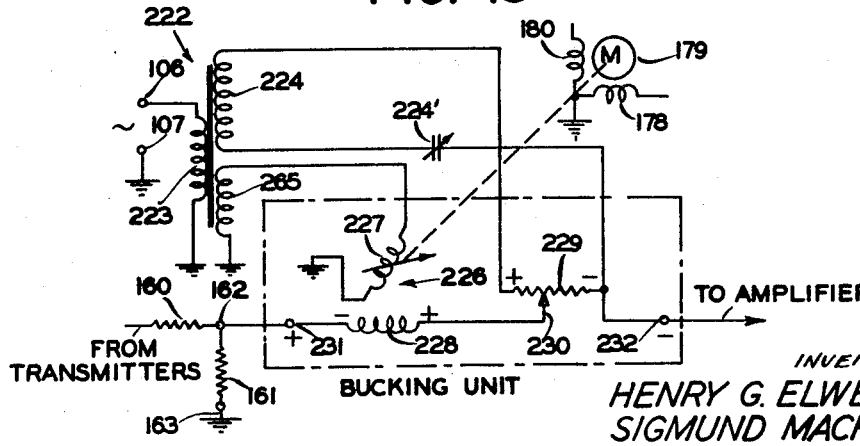
Fig. 15 illustrates a modified form of bucking unit which may be employed in lieu of the bucking unit of Fig. 8.

Fig. 15 illustrates a modified form of bucking unit. The rotatable linear-output transformer 226 corresponds to the follow-up transformer 185 of Fig. 8. In lieu of the locked transformer 190 there is provided a potentiometer 229 connected via a phasing condenser 224' across one secondary winding 224 of a transformer 222 having its primary winding energized from terminals 106, 107 and having a second secondary winding 225 connected to energize primary winding 227 of transformer 226. Slider 230 of potentiometer 229 is initially adjusted so that a voltage appears between slider 230 and terminal 232 which corresponds to the fixed voltage across winding 192 of Fig. 8 in the sense that it has a fixed phase substantially 180° out of phase the transmitted resultant voltage and a fixed magnitude equal to the maximum magnitude of the transmitted resultant voltage applied to the input 162, 163 of the bucking unit. The follow-up transformer 226 functions in the same manner as the follow-up transformer 185 of Fig. 8 and the potentiometer 229 serves effectively to double the range of rotor displacement of transformer 226.

In those applications where it is deemed desirable the rotatable transformers in the bucking units of Figs. 4 and 8 may be replaced by a constantly running generator which provides the required bucking voltage.

It will also be appreciated that the features of the switching mechanisms and locker transformers or potentiometers in the various units can also be utilized, but with less accuracy, in units employing the conventional type of rotatable transformer, that is a rotatable transformer which has a sinusoidal output voltage vs. rotor displacement characteristic rather than a linear characteristic over a satisfactory working range.

Moreover, it is also to be understood that a construction of the rotatable linear-output transformer other than the constructions specifically described herein may be employed in apparatus according to the present invention.

Although certain embodiments of the invention have been illustrated and described in detail by way of example, it is to be expressly understood that the invention is not limited thereto. Specific values of voltages, fluid flows, angular displacements etc. have been given simply by way of example. Various changes may be made in the design and arrangement of the elements without departing from the spirit and scope of the invention as will be understood by those skilled in the art.

We claim:
1. A total fluid flow indicating system comprising a plurality of transmitter units for developing in the output of each unit respectively an output voltage of the same one constant phase and of a magnitude representative of a respective different fluid flow, each unit including means for sensing respective fluid flow and a linear-output rotatable transformer having a primary winding adapted for excitation and having a secondary winding connected in the output of said unit, said transformer having a rotor for varying the inductive coupling between said windings and adapted for rotation by said sensing means only through an angular range wherein the relationship between the voltage across said secondary winding and the angular displacement of said rotor is substantially linear when a constant excitation is provided for said primary winding, means connecting the outputs of said units in series in a circuit to develop across a pair of terminals in said circuit a resultant voltage of said one constant phase and substantially proportional to total flow, a unit for balancing the system and having an output thereof connected with said terminals to complete a circuit in which the output voltage of said balancing unit is in constant phase opposition to said resultant voltage of said one phase, and total flow indicating means under the mutual control of said transmitter units and said balancing unit.

2. A system according to claim 1 wherein said balancing unit includes a second linear-output rotatable transformer.

3. In a system for transmitting electrical signals representative of the value of a variable quantity wherein electrical transmitter means are automatically controlled by means which sense said quantity and provide input intelligence to said transmitter means, which intelligence for a first range of values of said quantity up to a predetermined value of said quantity varies in accordance with a first law and which for a second range of values of said quantity beyond said predetermined value varies in accordance with a different second law, means for exciting said transmitter means to provide an output voltage across the output terminals thereof which varies in response to said input intelligence, and means for maintaining over both said ranges substantially the same law relating said output voltage with the value of the quantity being sensed notwithstanding that said input intelligence to said transmitter means follows a different law in each of said ranges.

4. In a system for transmitting electrical signals representative of the value of a variable quantity wherein displaceable transmitter means are automatically controlled by means which sense said quantity and provide an input mechanical displacement to said transmitter means, which displacement for a first range of values of said quantity varies in accordance with a first law and which for a second range of values of said quantity varies in accordance with a different second law, means for exciting said transmitter means to provide an output voltage across the output terminals thereof which varies in magnitude in response to said input displacement, and means for maintaining over both said ranges substantially the same linear relationship between said output voltage and the value of the quantity being sensed.

5. In a system for transmitting electrical signals representative of the value of a variable quantity, an electrical transmitter, means which sense said quantity and provide input intelligence to said transmitter means, which intelligence for a first range of values of said quantity varies in accordance with a first law and which for a second range of values of said quantity varies in accordance with a different second law, and means for applying as a second input to said transmitter means an excitation of a predetermined magnitude to said transmitter means when the values of said quantity occupy said first range and for applying an excitation of a different magnitude to said transmitter means when the values of said quantity occupy said second range.

6. In a system for transmitting electrical signals representative of the value of a variable quantity, an electrical transmitter, means which sense said quantity and provide input intelligence to said transmitter means, which for a first range of values of said quantity varies in accordance with a first law relating variation in the intelligence for variation in said quantity and which for a second range of values of said quantity varies in accordance with a second law, the variation in accordance with said second law of the intelligence for variation in said quantity being $1/n$ times the variation in accordance with said first law of the intelligence for the same variation in said quantity, and means for applying as a second input to said transmitter means an excitation of a predetermined magnitude when the values of said quantity occupy said first range and for applying an excitation of a magnitude approximately $n$ times said predetermined magnitude to said transmitter means when the values of said quantity occupy said second range.

7. In a system for transmitting electrical signals representative of the value of a variable quantity wherein electrical transmitter means are automatically controlled by means which sense said quantity and provide input intelligence to said transmitter means, which intelligence for a first range of values of said quantity varies in accordance with a first law and which for a second range of values of said quantity varies in accordance with a different second law, means for exciting said transmitter means as a second input to said transmitter means so that when the values of said quantity are in said first range the voltage across the output terminals of said transmitting means changes a predetermined amount per unit change in said intelligence, and means comprising switching means for providing across said output terminals when the values of said quantity are in said second range an output voltage which changes a predetermined different amount per unit change in said intelligence.

8. In combination, means for transmitting electrical signals representative of a variable condition including an inductive coupling device having a primary winding and a secondary winding, means for energizing said primary winding, displaceable means for varying the inductive coupling between said windings so that the voltage across said secondary winding depends upon the position of said displaceable means, and means for sensing the magnitude of said condition to displace said displaceable means a predetermined amount per unit change in the magnitude of said condition when the magnitude of said condition is in a first range and to displace said displaceable means a different amount per unit change in the magnitude of said condition when the magnitude of said condition is in a second range, said energizing means including means for providing said primary winding with a first excitation voltage of predetermined magnitude when the magnitude of said condition is in said first range and for providing said primary winding with a second excitation voltage of a different magnitude when the magnitude of said condition is in said second range.

9. In a system for totalizing a plurality of variable quantities wherein a resultant voltage representative of the total quantity appears at the input to a station, the resultant voltage having the same one phase over the range of magnitudes thereof from minimum magnitude to maximum magnitude and having a minimum magnitude $x$, an intermediate magnitude $y$ and a maximum magnitude $z$, means at said station having an input adapted to be supplied from a source of alternating current of substantially constant magnitude for developing across a pair of output terminals thereof an alternating voltage of substantially constant magnitude and of a phase substantially 180° displaced from said one phase, a rotatable transformer at said station having a primary winding adapted for excitation from the source of alternating current and a secondary winding connected in series with said pair of terminals, said transformer having a rotor for varying the inductive coupling between the primary and secondary windings thereof and adapted for rotation only through a range wherein the voltage across the secondary winding thereof bears an approximately linear relationship to the displacement of said rotor, means responsive to the difference between the magnitude of said resultant voltage and the magnitude of the algebraic sum of the voltages across said pair of terminals and said secondary winding for positioning said rotor to positions where the voltage across said secondary winding is of said one phase when said resultant voltage has a magnitude in the range between $x$ and $y$ and for positioning said rotor to positions where the voltage across said secondary winding has a phase substantially 180° displaced from said one phase when said resultant voltage has a magnitude in the range between $y$ and $z$, and a load device operatively responsive to the displacement of said rotor.

10. In a system for totalizing a plurality of variable quantities wherein a resultant signal representative of the total quantity appears at the input to an indicator station, the resultant signal having the same one phase over the entire range of magnitudes thereof and having a minimum magnitude $x$, an intermediate magnitude $y$ and a maximum magnitude $z$, a first transformer at said indicator station having a primary winding adapted for excitation from a source of alternating current of substantially constant magnitude and a secondary winding having a constant inductive coupling with said primary winding so as to develop across said secondary winding an alternating voltage of substantially constant magnitude and of a phase substantially 180° displaced from said one phase, a linear-output type rotatable second transformer at said indicator station having a primary winding adapted for excitation from a source of alternating current and a secondary winding connected in series with said first-mentioned secondary winding, said rotatable transformer having a rotor for varying the inductive coupling between the primary and secondary windings thereof and adapted for rotation on either side of its minimum coupling position only through a range wherein the voltage across the secondary winding thereof bears a substantially linear relationship to the displacement of said rotor, means responsive to the difference between the magnitude of said resultant voltage and the magnitude of the algebraic sum of the voltages across said secondary windings for positioning said rotor at positions where the voltage across the secondary winding of said rotatable transformer is of said one phase when said resultant voltage has a magnitude in the range between $x$ and $y$ and for positioning said rotor to positions where the voltage across the secondary winding of said rotatable transformer is of a phase substantially 180° displaced from said one phase when said resultant voltage has a magnitude in the range between $y$ and $z$, and means responsive to the displacement of said rotor for indicating the total of the variable quantities.

11. In an indicating system responsive to the variable magnitude of an input voltage appearing across a first pair of terminals and derived from the output of transmitter means, said input voltage having the same one phase over the entire range of magnitudes thereof and having a minimum magnitude $x$, an intermediate magnitude $y$ and a maximum magnitude $z$, a bucking unit having a pair of output terminals for developing a voltage thereacross which is always of a phase opposite to said one phase of said input voltage, a circuit including a pair of output terminals therefor and means connecting said last-mentioned terminals in series with the output terminals of said bucking unit, said circuit having a pair of input terminals for connection to said first pair of terminals to complete a series loop circuit wherein the bucking voltage across the terminals of said bucking unit is always in phase opposition to said input voltage so that a voltage proportional to the difference between said input voltage and said bucking voltage appears across said pair of output terminals for said circuit, said bucking unit including a linear-output type rotatable transformer having a primary winding adapted to be energized from a source of substantially constant periodically varying voltage and having a secondary winding series-connected between the pair of output terminals of said bucking unit, said transformer having a rotor for varying the inductive coupling between said windings and adapted upon changes in said input voltage magnitude between $x$ and $y$ for rotation on one side of its minimum coupling angular position only through a range wherein the voltage across said secondary winding has a substantially linear relationship with the displacement of said rotor and is of said one phase and adapted upon changes in said input voltage magnitude between $y$ and $z$ for rotation on the other side of its minimum coupling position only through a range wherein the voltage across said secondary winding has a substantially linear relationship with the displacement of said rotor and is of a phase opposite to said one phase, means for effectively extending the linear output range of rotation of said rotor in either direction while maintaining the bucking voltage appearing across said bucking unit output terminals always in phase opposition to said input voltage, said range extending means including means adapted to be supplied from the voltage source for producing across a pair of output terminals thereof a voltage of substantially constant magnitude and always of said opposite phase, means for connecting said secondary winding and said output terminals of said range-extending means in series between the output terminals of said bucking unit so that the magnitude of said bucking voltage is proportional to the algebraic sum of the voltage across said secondary winding and the voltage across said output terminals of said range-extending means, and indicating means operatively responsive to the position of said rotor.

12. In a system according to claim 11 wherein said minimum voltage magnitude $x$ is zero and said intermediate magnitude $y$ is approximately one-half of said maximum voltage magnitude $z$, said rotor being positioned when said input voltage is zero at an angular position which is a predetermined number of degrees on one side of its minimum coupling angular position, said rotor being positioned when said input voltage magnitude is $y$ at its minimum coupling position, said rotor being positioned when said input voltage magnitude is $z$ at an angular position which is said predetermined number of degrees on the other side of its minimum coupling position.

13. In a system for totalizing a plurality of variable quantities wherein a resultant input A. C. voltage derived from a transmitter assembly and representative of the total of the quantities is developed across a first pair of terminals and appears as an input to an indicator station, said resultant input voltage having the same one phase over the range of magnitudes thereof between zero magnitude and maximum magnitude thereof, a bucking unit having a pair of output terminals for developing an A. C. bucking voltage thereacross which is always of a phase opposite to said one phase of said resultant input voltage, a circuit including the output terminals of said bucking unit and a pair of output terminals for the output of said circuit and means connecting said last-mentioned terminals in series with the output terminals of said bucking unit, said circuit having a pair of input terminals for connection to said first pair of terminals to complete a series loop circuit wherein the bucking voltage across the terminals of said bucking unit is always in phase opposition to said resultant input voltage so that an A. C. voltage proportional to the difference between said resultant input voltage and said bucking voltage appears across said pair of output terminals for said circuit, said bucking unit including a linear-output type rotatable transformer having a primary winding for excitation by a source of substantially constant A. C. voltage and having a secondary winding series-connected between the output terminals of said bucking unit, said transformer having a rotor for varying the inductive coupling between said windings, means including a reversible motor electrically coupled to said pair of output terminals for said circuit and responsive to the output voltage thereacross upon changes in said resultant input voltage magnitude in the lower half of said range of magnitudes for rotating said rotor on one side of its minimum coupling angular position only through a range of R degrees wherein the voltage across said secondary winding has a substantially linear relationship with the displacement of said rotor and is of said one phase and upon changes in the resultant input voltage magnitude in the upper half of said range of magnitudes for rotating said rotor on the other side of its minimum coupling position only through a range of R degrees wherein the voltage across said secondary winding has a substantially linear relationship with the displacement of said rotor and is of a phase opposite to said one phase, means for effectively doubling the linear-output range of rotation of said rotor in either direction without changing the phase of said bucking voltage, said range-doubling means including a second transformer having a primary winding for excitation by the A. C. voltage source and a secondary winding for developing across said last-mentioned secondary winding an A. C. voltage of a substantially constant magnitude approximately equal to the maximum magnitude of the voltage developed across the secondary winding of said rotatable transformer and always of said opposite phase, means for connecting said secondary windings in series between the output terminals of said bucking unit so that the magnitude of said bucking voltage substantially equals the algebraic sum of the voltages across said secondary windings, and means controlled by the angular position of said motor for indicating the total of the variable quantities.

14. A total fluid flow indicating system comprising a plurality of transmitter units for developing in the output of each unit respectively an output voltage of the same one constant phase and of a magnitude representative of a respective different fluid flow, each unit including means for sensing respective fluid flow and a first linear-output rotatable transformer having a primary winding adapted for excitation and having a secondary winding connected in the output of said unit, said transformer having a first rotor for varying the inductive coupling between said windings and adapted for rotation by said sensing means only through an angular range wherein the relationship between the voltage across said secondary winding and the angular displacement of said rotor is substantially linear when a constant excitation is provided for said primary winding, means connecting the outputs of said units in series in a circuit to develop across a pair of terminals in said circuit a resultant voltage of said one constant phase and substantially proportional to total flow, a unit for balancing the system and having an output thereof connected in a circuit with said terminals to complete a circuit in which the output voltage of said balancing unit is in constant phase opposition to said resultant voltage of said one phase, said balancing unit including a second linear-output rotatable transformer having a primary winding adapted for constant excitation and having a secondary winding connected in the output of said balancing unit, said second transformer having a second rotor for varying the inductive coupling between the windings thereof and adapted for rotation only through an angular range wherein the relationship between the voltage across the secondary winding thereof and the angular displacement of said second rotor is substantially linear, and total flow indicating means responsive to the displacement of said second rotor.

15. A system for measuring the total flow of fluid through a plurality of conduits, comprising a plurality of transmitter units each having a pair of electrical output terminals and each associated with a different one of the conduits so as to develop across said pairs of terminals output voltages which are all of the same one fixed phase and which have magnitudes representative of the fluid flow through the respective conduits, each unit including means movable in response to fluid flow through the respective conduit and a linear-output type rotatable transformer having a primary winding and having a secondary winding connected in series between the respective pair of terminals, said transformer having a rotor for varying the inductive coupling between said windings and adapted for rotation by said movable means only through a restricted angular range wherein the voltage across said secondary winding is substantially proportional to the angular displacement of said rotor for an assumed constant excitation of said primary winding, means connecting said pairs of output terminals in series in a circuit to develop across a pair of terminals in said circuit a resultant voltage of said one fixed phase and substantially proportional to total fluid flow, a bucking unit having a pair of output terminals connected in a circuit with said last-mentioned pair of terminals to complete a circuit in which the output voltage of said bucking unit is in constant phase opposition to said resultant voltage of said one fixed phase, said bucking unit including a follow-up linear-output type rotatable transformer having a primary winding adapted for excitation independently of said transmitter units and having a secondary winding connected in series between the pair of output terminals of said bucking unit, said follow-up rotatable transformer having a rotor for varying the inductive coupling between the windings thereof and adapted for rotation only through a restricted angular range wherein the voltage across the secondary winding thereof is substantially proportional to the angular displacement of the rotor thereof, means responsive to the difference between said resultant voltage and the bucking voltage across said bucking unit output terminals for displacing the rotor of said follow-up rotatable transformer until said difference becomes substantially zero, and means responsive to the displacement of said last-mentioned rotor for indicating the total flow of fluid through the conduits.

16. In a system for totalizing the rate of flow of fluid through a plurality of conduits, a plurality of electrical totalizer units each responsive to the rate of flow of fluid through a different one of said conduits and each including a rotatable linear-output transformer having primary winding means adapted for alternating current excitation and secondary winding means and a rotor for varying the inductive coupling between said primary and secondary winding means, means associated with each unit and responsive to the rate of flow of fluid through a respective one of the conduits for displacing the rotor of the respective transformer so that the voltage across its secondary winding means depends upon the magnitude of the rate of fluid flow through the respective conduit, an electrical bucking unit, each of said transformers having its rotor adapted for rotation only through a restricted angular range wherein the relationship between the voltage induced in the secondary winding means and the angular displacement of its rotor is substantially linear when a constant excitation is applied to the primary winding means thereof, said totalizer units producing signals in their outputs which are all of the same one constant phase, means connecting said totalizer unit outputs in a common circuit for algebraic addition to produce a resultant signal in said circuit which is substantially proportional to the total rate of flow of fluid through all of the conduits, said bucking unit producing a follow-up bucking signal of a constant phase opposite to said one phase, means connecting the output of said bucking unit in circuit with the outputs of said totalizer units and in opposition with said resultant signal to produce system equilibrium when said bucking signal substantially equals said resultant signal, and means controlled by said bucking unit for indicating said total rate of fluid flow.

17. In combination, means for transmitting electrical signals representative of a variable condition including an inductive coupling device having a primary winding and a sceondary winding, means for energizing said primary winding, displaceable means for varying the inductive coupling between said windings so that the voltage across said secondary winding depends upon the position of said displaceable means, means for sensing the magnitude of said condition to displace said displaceable means a predetermined amount per unit change in the magnitude of said condition when the magnitude of said condition is in a first range and to displace said displaceable means a different amount per unit change in the magnitude of said condition when the magnitude of said condition is in a second range, said energizing means including means for providing said primary winding with a first excitation voltage of predetermined magnitude when the magnitude of said condition is in said first range and for providing said primary winding with a second excitation voltage of a different magnitude when the magnitude of said condition is in said second range, and means including switching means for substituting across said primary winding one of said excitation voltages for the other excitation voltage when said displaceable means is at a position where the voltage developed across said secondary winding has a predetermined magnitude small in comparison with the maximum voltage developed across said secondary winding, whereby the transmission of voltage surges during the switching period is substantially reduced or eliminated.

18. In combination, means for transmitting electrical signals representative of a variable condition including an inductive coupling device having a primary winding and a secondary winding, means for energizing said primary winding, displaceable means for varying the inductive coupling between said windings so that the voltage across said secondary winding depends upon the position of said displaceable means, means for sensing the magnitude of said condition to displace said displaceable means a predetermined amount per unit change in the magnitude of said condition when the magnitude of said condition is in a first range and to displace said displaceable means a different amount per unit change in the magnitude of said condition when the magnitude of said condition is in a second range, said energizing means including means for providing said primary winding with a first excitation voltage of predetermined magnitude when the magnitude of said condition is in said first range and for providing said primary winding with a second excitation voltage of a different magnitude when the magnitude of said condition is in said second range, and means including switching means for substituting across said primary winding one of said excitation voltages for the other of said excitation voltage when said displaceable means is at a position providing minimum coupling between said windings so that the voltage across said secondary winding is substantially zero.

References Cited in the file of this patent

UNITED STATES PATENTS

| 1,448,402 | Hayes | Mar. 13, 1923 |
| 1,637,039 | Hewlett | July 26, 1927 |
| 2,420,539 | Hornfeck | May 13, 1947 |
| 2,538,158 | Long | Jan. 16, 1951 |
| 2,590,946 | Darling | Apr. 1, 1952 |
| 2,672,600 | Cary | Mar. 16, 1954 |

FOREIGN PATENTS

| 454,012 | Great Britain | Sept. 16, 1936 |